United States Patent [19]

Job et al.

[11] Patent Number: 4,914,069

[45] Date of Patent: Apr. 3, 1990

[54] PREPARATION OF OLEFIN POLYMERIZATION CATALYST COMPONENT

[75] Inventors: Robert C. Job, Houston; Steven M. Nestlerode, Katy, both of Tex.

[73] Assignee: Shell Oil Company, Houston, Tex.

[21] Appl. No.: 229,406

[22] Filed: Aug. 8, 1988

Related U.S. Application Data

[63] Continuation-in-part of Ser. No. 46,203, May 4, 1987, abandoned.

[51] Int. Cl.$^4$ .................................................. B01J 4/64
[52] U.S. Cl. ..................................... 502/107; 502/104; 502/111; 502/121; 502/122; 502/123; 502/124; 502/125; 502/126; 502/127
[58] Field of Search ............... 502/104, 107, 111, 121, 502/122, 123, 124, 125, 126, 127

[56] References Cited

U.S. PATENT DOCUMENTS

| | | | |
|---|---|---|---|
| 4,136,243 | 1/1979 | Appleyard et al. | 502/121 X |
| 4,329,253 | 5/1982 | Goodall et al. | 502/104 X |
| 4,393,182 | 7/1983 | Goodall et al. | 526/125 |
| 4,400,302 | 8/1983 | Goodall et al. | 502/127 X |
| 4,414,132 | 11/1983 | Goodall et al. | 502/127 X |
| 4,526,882 | 7/1985 | Johnson et al. | 502/105 |
| 4,535,068 | 8/1985 | Job | 502/107 |
| 4,613,581 | 9/1986 | Maruyama et al. | 502/127 |

FOREIGN PATENT DOCUMENTS 1554340 6/1977 United Kingdom .
1486194 9/1977 United Kingdom .

*Primary Examiner*—Patrick P. Garvin

[57] ABSTRACT

Solid catalyst components for use in the polymerization of olefins and having improved activity and selectivity are prepared by:

(a) halogenating a magnesium compound containing at least one aryloxy, alkyl carbonate or alkyloxy group with a first halide of tetravalent titanium and a first electron donor;

(b$_1$) contacting the resulting halogenated product with a second halide of tetravalent titanium; and (c) washing a resulting treated halogenated product with an inert hydrocarbon liquid, wherein a second electron donor is used in step (a) or step (b$_1$) and in that the product of step (b$_1$) is contacted in a step b$_2$ with a third halide of tetravalent titanium at a temperature of 40° to 140° C. and thereafter the treated product is washed in step (c).

11 Claims, No Drawings

PREPARATION OF OLEFIN POLYMERIZATION CATALYST COMPONENT

This is a continuation-in-part of U.S. Ser. No. 046,203, filed May 4, 1987, and now abandoned.

BACKGROUND OF THE INVENTION

This invention relates to a process for preparing a solid olefin polymerization catalyst component having improved activity and selectivity.

There are numerous prior art proposals to provide olefin polymerization catalysts by combining a solid component comprising at least magnesium, titanium and halogen, particularly chlorine with an activating organoaluminum compound. These may be referred to as supported coordination catalysts or catalyst systems. The activity and stereospecific performance of such compositions is generally improved by incorporating an electron donor (Lewis base) in the solid component and by employing as a third catalyst component an electron donor which may be complexed in whole or in part with the activating organoaluminum compound.

For convenience of reference, the solid titanium-containing constituent of such catalysts is referred to herein as "procatalyst", the organoaluminum compound, whether used separately or partially or totally complexed with an electron donor, as "cocatalyst", and the electron donor compound, whether used separately or partially or totally complexed with the organoaluminum compound, as "selectivity control agent" (SCA).

Supported coordination catalysts of this type are disclosed in numerous patents. The catalyst systems of this type which have been disclosed in the prior art generally are able to produce olefin polymers in high yield and, in the case of catalysts for polymerization of propylene or higher alpha-olefins, with high selectivity to stereoregular polymer. However, further improvements in productivity at high stero-regularity are still being sought.

The objective of workers in this art is to provide catalyst systems which exhibit sufficiently high activity to permit the production of olefin polymers in such high yield as to obviate the necessity of extracting residual catalyst components in the deashing step. In the case of propylene and higher olefins, an equally important objective is to provide catalyst systems of sufficiently high selectivity toward isotactic or otherwise stereoregular products to obviate the necessity of extracting atactic polymer components.

Although many chemical combinations provide active catalyst systems, practical considerations have led workers in the art to concentrate on certain preferred components. The procatalysts typically comprise magnesium chloride, titanium chloride, generally in tetravalent form, and as electron donor an aromatic ester such as ethyl benzoate or ethyl-p-toluate. The cocatalyst typically is an aluminum trialkyl such as aluminum triethyl or aluminum tri-isobutyl, often used at least partially complexed with selectivity control agent. The selectivity control agent typically is an aromatic ester such as ethyl-paramethoxy-benzoate(ethyl anisate) or methyl-p-toluate.

While the selection of a cocatalyst and selectivity control agent affects the performance of those catalyst systems, the component which appears to be subject to most significant improvement with respect to activity and productivity of the system is the procatalyst.

Preferred methods of preparing such procatalyst are described in U.S. Pat. Nos. 4,329,253, 4,393,182, 4,400,302, and 4,414,132. These procatalysts are highly active and stereospecific. The typical manner of preparing such procatalysts involves the reaction of the magnesium compound, titanium tetrachloride and electron donor in the presence of a halohydrocarbon. The resulting solid particle are then contacted with additional quantities of $TiCl_4$ and the preparations are completed by washing off excess $TiCl_4$ using light hydrocarbons (e.g., isooctane and isopentane) and drying.

The procatalysts prepared in this way have excellent polymerization activity (polymer yield) and stereospecific performance (isotactic content). However, for some applications the activity and selectivity still need improvement.

SUMMARY OF THE INVENTION

The process for preparing a solid catalyst component for use in the polymerization of olefins, which catalyst component contains magnesium, titanium and halogen and is prepared by the steps of:

(a) halogenating a magnesium compound of formula Mg R'R", wherein R' is an alkoxy, alkyl carbonate or aryloxy group and R" is halogen or an alkyl, aryl, alkoxy, alkyl carbonate or aryloxy group with a first halide of tetravalent titanium and a first electron donor;

($b_1$) contacting the resulting halogenated product with a second halide of tetravalent titanium; and (c) washing a resulting treated halogenated product with an inert hydrocarbon liquid, characterized in that a second electron donor is used in step (a) or step ($b_1$) and in that the product of step ($b_1$) is contacted in a step ($b_2$) with a third halide of tetravalent titanium at a temperature of 40° to 140° C. and thereafter the treated product is washed in step (c).

DETAILED DESCRIPTION OF THE INVENTION

The invention relates to a process for preparing a procatalyst which possesses a very high activity and selectivity when used in polymerizing olefins such as propylene.

The invention provides a process for preparing a solid catalyst component for use in the polymerization of olefins, which catalyst component contains magnesium, titanium and halogen and is prepared by the steps of:

(a) halogenating a magnesium compound of formula Mg R'R", wherein R' is an alkoxy, alkyl carbonate, or aryloxy group and R" is halogen or an alkyl, aryl, alkoxy, alkyl carbonate or aryloxy group with a first halide of tetravalent titanium and a first electron donor;

($b_1$) contacting the resulting halogenated product with a second halide of tetravalent titanium; and (c) washing a resulting treated halogenated product with an inert hydrocarbon liquid, characterized in that a second electron donor is used in step (a) or step ($b_1$) and in that the product of step ($b_1$) is contacted in a step ($b_2$) with a third halide of tetravalent titanium at a temperature of 40° C. to 140° C. and thereafter the treated product is washed in step (c). Preferably the halogenation in step (a) is conducted in the presence of a halohydrocarbon such as chlorobenzene.

Thus, in accordance with the present invention, the solid catalyst component is obtained by incorporating at least one additional inside electron donor and/or exchanging a portion of the first inside electron donor with a second electron donor in the procatalyst composition.

As shown by data in the examples which follow, catalysts prepared according to the present invention have the principal advantages of higher productivity and lower catalyst decay rate. Higher productivity is indicated by an increase of up to 20% in the amount of polymer produced in a typical two hour polymerization for a given amount of titanium (Ti) or for a given amount of catalyst, when compared to the amount of polymer prepared by previously described methods, and lower catalyst decay rate is indicated by the productivity of the catalyst available for the second hour of typical two hour polymerization being equivalent to about 40% of the productivity for the first hour.

This invention provides an improvement in polymerization of alpha mono-olefins by means of supported coordination catalyst systems which comprise (a) a procatalyst, (b) a cocatalyst and (c) a selectivity control agent, wherein (a) is a highly active solid composition prepared in accordance with the invention; (b) is an organoaluminum compound such an an aluminum alkyl; and (c) is an electron donor. Components (b) and (c) may be wholly or partly complexed with each other prior to being combined with the procatalyst.

Any halide of tetravalent titanium may be used as neat substance, or the substance in a concentrated solution, for example in a hydrocarbon or halohydrocarbon solvent which is preferably inert.

Various embodiments of the process of the invention are as follows:

I. The second electron donor is used in step (a) of the process. In this embodiment it has been found that after initial halogenation of the magnesium compound starting material (Mg(OEt)$_2$), with a tetravalent titanium halide (such as TiCl$_4$) and a halohydrocarbon (such as chlorobenzene) the amount of second electron donor used should be insufficient to exchange a major portion of the first electron donor, and the amount of second electron donor used suitably is from 0.05 mole equivalents of the first electron donor.

II. The second electron donor is used in step (b$_1$). In this embodiment it has been found particularly advantageous to add the second electron donor to the halogenated magnesium compound in the same mole equivalents as described for Embodiment I.

III. Step (a) comprises halogenating the magnesium compound with the first halide of tetravalent titanium and first electron donor until halogenation is eventually complete thereby forming an intermediate product which is not isolated, and contacting the intermediate product with the second electron donor. In this embodiment after using the first electron donor, for example ethyl benzoate, in the initial digestion/halogenation step with formation of an intermediate product, an amount of 0.5 to 1.2 mole of the second electron donor, for example isobutyl phthalate, per mole of first electron donor, is added to form the halogenated product. In this way excellent productivity and catalyst decay rates can be obtained.

Embodiment II provides a catalyst which not only exhibits a very slow decay rate, so that after 50-60 minutes the productivity of the catalyst equals or exceeds that of, for example, an "only" ethyl benzoate-based catalyst, which is known for its extremely high initial activity but relatively rapid decay rate (90% of the productivity occurs in about the first 15 minutes of the standard polymerization).

Catalysts employing procatalyst prepared according to this invention may exhibit as much as 20% greater productivity in solvent slurry polymerization, liquid monomer slurry process (LIPP), liquid monomer solution process, gas phase polymerization (both stirred and fluidized bed) or any of the various and several methods for polymerizing olefins for the production of polymer of a specific high isotacticity, compared to catalysts employing procatalysts which have not been produced using the second electron donor.

Examples of halogen-containing magnesium compounds that can be used as starting materials for the halogenating reaction are alkoxy, alkyl carboxy and aryloxy magnesium halides, such as isobutoxy magnesium chloride, ethoxy magnesium bromide, phenoxy magnesium iodide, cumyloxy magnesium bromide and naphthenoxy magnesium chloride.

Preferred magnesium compounds to be halogenated are selected from magnesium dialkoxides, magnesium bis(alkyl carbonates) and magnesium diaryloxides. Mixtures of such compounds can be used. In such compounds the alkoxide groups suitable have from 1 to 8 carbon atoms, and preferably from 2 to 8 carbon atoms. Examples of these preferred groups of compounds include but are not limited to: magnesium di-isopropoxide, magnesium diethoxide, magnesium ethyl carbonate, magnesium methyl carbonate, magnesium propyl carbonate, magnesium dibutoxide, magnesium diphenoxide, magnesium dinaphthenoxide, and ethoxy magnesium isobutoxide. Magnesium diethoxide is particualrly preferred.

Magnesium compounds comprising one alkyl or aryl group and one alkoxide or aryloxide group can also be employed. Examples of such compounds are phenyl magnesium phenoxide, ethyl magnesium butoxide, ethyl magnesium phenoxide, and naphthyl magnesium isoamyloxide.

Until this time, it has been necessary to halogenate the magnesium compounds which are preferred for reaction to form the necessary magnesium halides with a halide of tetravalent titanium. The most preferred reactions are those leading to fully halogenated reaction products, i.e. magnesium-dihalides. Such halogenation reactions are suitably effected by employing a molar ratio of magnesium compound to titanium compound of 0.005:1 to 2:1, preferably 0.01:1 to 1:1. These halogenation reactions are conducted in the presence of a halohydrocarbon and an electron donor. An inert hydrocarbon diluent or solvent may also be present.

Suitable halides of tetravalent titanium include aryloxy- or alkoxy-di- and trihalides, such as dihexanoxy-titanium dichloride, diethoxy-titanium dibromide, isopropoxy-titanium tri-iodide, and phenoxy-titanium trichloride, but titanium tetrahalides are preferred and most preferred is titanium tetrachloride.

Suitable electron donors which are used in the preparation of the solid catalyst component are ethers, esters, ketones, phenols, amines, amides, imines, nitriles, phosphines, phosphites, stibines, arsines, phosphoramides and alcoholates. Examples of suitable donors are those referred to in U.S. Pat. No. 4,136,243, Great Britain Patent 1,486,194, Great Britain 1,554,340 and German Patent 2,729,126. Preferred donors are esters, diesters and diamines, particularly ester and diesters of carboxylic acids, preferably aromatic carboxylic acids, such as ethyl and methyl benzoate, p-methoxy ethyl benzoate, p-ethoxy methyl benzoate, ethyl acrylate, methyl methacrylate, ethyl acetate, dimethyl carbonate, dimethyl adipate, diisobutyl phthalate, dihexyl fumarate, dibutyl maleate, ethylisopropyl oxalate, p-chloro ethyl benzoate, p-amino hexyl benzoate, isopropyl naphthenate, n-amyl toluate, ethyl cyclohexanoate, propyl pivalate, N,N,N',N'-tetramethylethylenediamine, and also 1,2,4-trimethylpiperazine, 2,3,4,5-tetraethylpiperidine and similar compounds. The electron donors may be used singly or in combination. Preferred electron donors for use in preparing the solid catalyst component are ethyl benzoate and isobutyl phthalate.

In this specification, the electron donors used will be distinguished from each other as being "primary electron donors" and "secondary electron donors". The phrase "primary electron donor" means the electron donor that has the largest mole percent of all electron donors present in the final procatalyst.

The halogenation normally proceeds under formation of a solid reaction product which may be isolated from the liquid reaction medium by filtration, decantation or another suitable method and may be subsequently washed with an inert hydrocarbon diluent, such as n-hexane, iso-octane or toluene, to remove any unreacted material, including physically absorbed halohydrocarbon.

Suitable halohydrocarbons are compounds such as butyl chloride, amyl chloride and the following more preferred compounds. Preferred aliphatic halohydrocarbons are halogen-substituted hydrocarbons with 1 to 12, particularly less than 9, carbon atoms per molecule, comprising at least two halogen atoms, such as dibromomethane, trichloromethane, 1,2-dichloroethane, dichlorobutane, 1,1,3-trichloroethane, trichlorocyclohexane, dichlorofluoroethane, trichloropropane, trichlorofluorooctane, dibromodifluorodecane, hexachloroethane and tetrachloroisooctane. Carbon tetrachloride and 1,1,3-trichloroethane are preferred aliphatic halohydrocarbons. Aromatic halohydrocarbons may also be employed, e.g. chlorobenzene, bromobenzene, dichlorobenzene, dichlorodibromobenzene, naphthyl chloride, chlorotoluene and dichlorotoluenes; chlorobenzene and dichlorobenzene are preferred aromatic halohydrocarbons. Chlorobenzene is the most preferred halohydrocarbon.

Subsequent to halogenation, the product is contacted with a halide of tetravalent titanium such as a dialkoxytitanium dihalide, alkoxytitanium trihalide, phenoxytitanium trihalide or titanium tetrahalide. The most preferred titanium compounds are titanium tetrahalides and especially titanium tetrachloride. This treatment increases the content of tetravalent titanium in the solid catalyst component. This increase should preferably be sufficient to achieve a final atomic ratio of tetravalent titanium to magnesium in the solid catalyst component of from 0.005/1 to 1.0/1 particularly of from 0.02/1 to 0.2/1. Contacting the solid catalyst component with tetravalent titanium chloride is suitably carried out at a temperature of from 40° to 140° C. for 0.1 to 6 hours, optionally in the presence of an inert hydrocarbon or halohydrocarbon diluent. Particularly preferred contacting temperatures are from 70° to 120° C., and the most preferred contacting periods are 0.5 to 3.5 hours. The treatment may be carried out in successive contacts of the solid with separate portions of a halide of tetravalent titanium as hereinbefore described (such as $TiCl_4$), optionally in the presence of a halohydrocarbon which may contain suitable electron donors chosen from the previous list.

The preferred halogen atom, possibly contained in the magnesium compound to be halogenated, and contained in the titanium compound which serves as halogenating agent and in the tetravalent titanium halide with which the halogenated product is contacted, is chlorine.

One novel and unobvious aspect of the present invention involves the use of the second electron donor, subsequent to, or concurrent with, the use of the first electron donor.

Until this time, the electron donor used to prepare the preferred magnesium chloride ($MgCl_2$) supported titanium tetrachloride ($TiCl_4$) catalyst was required not only to cause the ideal crystalline size in the resultant catalyst product, but also to act as the bound activation/selectivity control agent. It has been found that for a slowly decaying Ziegler/Natta type catalyst, the electron donor which is best for converting compounds like magnesium ethoxide to magnesium chloride is not necessarily the best one for optimizing the productivity, selectivity or decay characteristics.

The treated catalyst component can be suitably isolated from the liquid reaction medium by washing to remove unreacted titanium compound from the reaction product. The titanium content of the final, washed, catalyst constituent is preferably 1.5 to 3.6 percent by weight, but can be up to about 4.5 percent by weight.

The material used to wash the catalyst component is preferably an inert, light hydrocarbon liquid. Preferred light hydrocarbon liquids include aliphatic, alicyclic and aromatic hydrocarbons. Examples of such liquids include iso-pentane, n-hexane, iso-octane and toluene with iso-pentane being most preferred.

The amount of light hydrocarbon liquid employed can be 5 to 100 $cm^3$/gm of procatalyst in each of 2 to 6 separate washes, and preferably is about 25 $cm^3$/gm of procatalyst.

The resulting solid component is the procatalyst, which is used with cocatalyst and selectivity control agent in the polymerization process.

The organoaluminum compound to be employed as cocatalyst may be chosen from any of the known activators in olefin polymerization catalyst systems comprising a titanium halide but is most suitably free of halogens. Trialkylaluminum compounds, dialkylaluminum halides and dialkylaluminum alkoxides may be used, with trialkylaluminum compounds preferred, particularly those wherein each of the alkyl groups has 2 to 6 carbon atoms, e.g., triethylaluminum, tri-n-propylaluminum, triisobutylaluminum, triisopropylaluminum, and dibutyl-n-amylaluminum.

Electron donors for use in combination with or reacted with an organoaluminum compound as selectivity control agents can be selected from the electron donors described above for use in the preparation of the solid catalyst component. Silanes can also be used. Preferred donors are esters and organic silicon compounds. Preferred esters are esters of carboxylic acids, preferably aromatic carboxylic acids, such as ethyl and methyl benzoate, p-methoxy ethyl benzoate, p-ethoxy methyl benzoate, p-ethoxy ethyl benzoate, ethyl acrylate, methyl methacrylate, ethyl acetate, dimethyl carbonate, dimethyl adipate, dihexyl fumarate, dibutyl maleate, ethylisopropyl oxolate, p-chloro ethyl benzoate, p-amine hexyl benzoate, isopropyl naphthenate, n-amyl toluate, ethyl cyclohexanoate and propyl pivalate. Examples of the organic silicon compounds useful herein include alkoxysilanes and acryloxysilanes of the general formula $R^1_n Si(OR^2)_{4-n}$ where n is between zero and three, $R^1$ is a hydrocarbon group or a halogen atom and $R^2$ is a hydrocarbon group. Specific examples include trimethylmethoxy silane, triphenylthoxy silane, dimethyldimethoxy silane and phenyltrimethoxy silane. The donor used as selectivity control agent in the catalyst may be the same as or different from the donor(s) used in preparing the titanium containing constituent.

Preferred first and second electron donors for use in preparing the titanium constituent are dimethyl napthalene as the first electron donor and diisobutyl phthalate, or ethyl benzoate as the second electron donor; or diisobutyl phthalate as the first electron donor and ethyl benzoate as the second donor. Preferred selectivity control agents for use in the total catalyst are p-ethoxy ethyl benzoate, phenethyltrimethoxy silane and diphenyldimethoxy silane.

Preferred proportions of selectivity control agent, employed separately, in combination with, or reacted with an organoaluminum compound, calculated as mol per mol aluminum compound, are from 0.005/1 to 1.5/1, particularly from 0.05/1 to 0.5/1. Preferred proportions of selectivity control agent calculated as mol per mol Ti are 0.1/1 to 50/1, particularly 0.5/1 to 20/1.

Proportions of primary electron donor contained in the solid catalyst component, calculated as mol per mol of titanium, are suitably from 0.01/1 to 10/1, e.g. from 0.05/1 to 5/1 and especially from 0.5/1 to 3/1.

Proportions of secondary electron donor contained in the solid catalyst component, calculated as mol per mol of titanium, are suitably from 0.01/1 to 2/1, and especially from 0.05/1 to 0.5/1.

To prepare the final polymerization catalyst composition, procatalyst, cocatalyst and selectivity control agent, if used separately, may be simply combined, most suitably employing a molar ratio to produce in the final catalyst an atomic ratio of aluminum to titanium of from 1/1 to 150/1, and suitably from 10/1 to 150/1. In general, Al/Ti ratios of 30/1 to 100/1 and especially of 50/1 to 80/1 will be found advantageous.

The productivity of the procatalyst is determined as kilograms (kg) of polymer per gram (g) of procatalyst in a standard one or two hour batch reaction. Productivity of the procatalyst may also be expressed as kg polymer/g titanium (Ti). Catalyst activity is sometimes reported as kg polymer/g procatalyst/hr.

The selectivity to isotactic polypropylene is determined by measuring the amount of xylene soluble polymer (XS), in accordance with regulations of the U.S. Food and Drug Administration (FDA). The XS test is carried out as follows:

The sample is completed dissolved in xylene, which contains oxidation inhibitor, in a stirred flask by heating under reflux at 120° C. The flask is then immersed in a water bath at 25° C. without stirring for one hour, during which the insoluble portion precipitates. The precipitate is filtered off and the solubles present in the filtrate are determined by evaporating a 10 ml aliquot of the filtrate, drying the residue under vacuum, and weighting the residue. The xylene-solubles consist of amorphous material with some low molecular weight crystalline material (FDA regulations 121.2501 and 1.1.2510, 1971.)

The numerical value of XS in the case of propylene homopolymer is typically about 2 percent less than the amount of polymers extractable in refluxing n-heptane. Thus, the isotacticity index of polypropylene (amount insoluble in refluxing n-heptane) is approximately 100-(XS+2).

PREPARATION OF THE PROCATALYSTS

In the following examples (in which percentages are by weight unless indicated otherwise), the procatalysts (examples 1-9) were prepared as follows: Electron donors (type and amount shown in the examples) were added along with 150 ml of a 1:1 (vol:vol) mixture of titanium tetrachloride and chlorobenzene to 50 mmol of the appropriate magnesium precursor, magnesium ethoxide, and stirred at temperature for up to about 15 minutes. The mixture was then stirred for up to an hour at 110° C. and filtered hot, at about 110° C.

The residual solid was slurried in 150 ml of the 1:1 (vol:vol) titanium tetrachloride/chlorobenzene solution and, where required by the indicated method (I–III), up to about 11 mmol of a second electron donor, and optionally, about 2 mmol phthaloyl chloride (see U.S. Pat. No. 4,535,068). The slurry was stirred for up to about an hour at 110° C., and filtered again at about the same temperature. The solid was then slurried in 150 ml of a 1:1 titanium tetrachloride/chlorobenzene solution and stirred at about 110° C. for up to about 30 minutes and filtered again at about the same temperature. The reaction vessel was cooled to below 40° C. and the solid was washed 6 times with 150 ml portions of isopentane then dried for 100 minutes, at 40° C., under moving nitrogen. The titanium content for each of the various procatalysts is shown in Tables 1 and 2. The catalysts of examples 1, 3, 5, and 8 controls:

EXAMPLES 1. (Comparative Example) magnesium ethoxide (5.72 gm, 50 mmol) and Bis(2-ethylhexyl) phthalate (12.8 mmol/50 mmol Mg) were used in step a of the catalyst preparaion described above; followed by two TiCl$_4$/chlorobenzene washes to give a Catalyst A containing 2.32% Ti. The productivity of a catalyst comprising triethyl aluminum (TEA), diphenyl dimethoxy silane (DPDMS) and titanium containing Catalyst a, in a 2 hour liquid propylene polymerization (LIPP) run using 70:35:1 TEA:DPDMS:Ti, was 966 kg polypropylene (PP)/g Ti at 5.3% xylene solubles.

2. Magnesium ethoxide (5.72 gm, 50 mmol) and Ethyl benzoate (16.7 mmol/50 mmol Mg) were used in step a of the catalyst preparation described above (0.5 hr); followed by two TiCl$_4$/chlorobenzene washes containing diisobutyl phthalate (5.4 mmol each), steps b$_1$, and a final TiCl$_4$/chlorobenzene wash step b$_2$ to give a Catalyst B containing 2.34% Ti after the final step c wash. The productivity in a two hour LIPP run using 70:17.5:1 TEA-DPDMS:Ti, was 1190 kg PP/g Ti at 3.4% xylene solubles, for a productivity increase in the catalyst of 23% over productivity of the catalyst in Comparative Example 1.

3. (Comparative Example) Magnesium ethoxide (5.72 gm, 50 mmol) and Ethyl benzoate (16.7 mmol/50 mmol Mg) were used in step a of the catalyst preparation described above; followed by two TiCl$_4$/chlorobenzene washes to give a Catalyst C containing 3.05% Ti. The productivity of the catalyst, in a 1 hour LIPP run using 70:35:1 TEA:p-ethoxy ethyl benzoate (PEEB):Ti, was 21.4 kg PP/g at 4.1% xylene solubles. 4. Magnesium ethoxide (5.72 gm, 50 mmol) and Ethyl benzoate (16.7 mmol/50 mmol Mg) were used; followed by isobutyl phthalate (5.4 mmol), added directly to the product of step a after 0.5 hour; followed by a wash of isobutyl phthalate (5.4 mmol) in TiCl₄/chlorobenzene; followed by a wash of TiCl₄/chlorobenzene to give a Catalyst D containing 3.75% Ti. The productivity of the catalyst, in a one hour LIPP run using 70:17.5:1 TEA:DPDMS:Ti, was 28.8 kg PP/g at 4.3% xylene solubles, for a catalyst productivity increase of 34% over the catalyst of Comparative Example 3.

5A. (Comparative Example-liquid phase) Magnesium ethoxide (5.72 gm, 50 mmol) and Di-isobutyl phthalate (6.0 mmol/50 mmol Mg) were used in step a of the catalyst preparation described above; followed by two TiCl₄/chlorobenzene washes to give a Catalyst E containing 3.04% Ti and 12.6% di-isobutyl phthalate. The productivity of this catalyst, in a 2 hour LIPP run using 70:17.5:1 TEA:DPDMS:Ti, was 1391 kg PP/g Ti at 4.8% xylene solubles.

5B. (Comparative Example-gas phase) The same procatalyst of Example 5A, Catalyst E was used to carry out a propylene polymerization in gas phase for a period of 2 hours using 0.42/0.10/0.006 TEA:EPDMS:Ti (mol/mol/mol). The productivity of the catalyst was 639 kg PP/g Ti at 3.2% xylene solubles.

6. Magnesium ethoxide (5.72 gm, 50 mmol), Di-isobutyl phthalate (6.0 mmol/50 mmol Mg) and ethyl benzoate (1.8 mmol) were used in step a of the catalyst preparation described above (1.0 hr); followed by two washes of TiCl₄/chlorobenzene (1.0 hr and 0.5 hr) to give a Catalyst F containing 2.94% Ti, 0.46% ethyl benzoate and 11.9% di-isobutyl phthalate. The productivity, in a 2 hour LIPP run using 70:17.5:1 TEA:DPDMS:Ti, was 1496 Kg PP/g Ti at 4.9% xylene solubles.

7A. (Liquid phase) Magnesium ethoxide (5.72 gm, 50 mmol) and Di-isobutyl phthalate (6.0 mmol/50 mmol Mg) were used in step a of the catalyst preparation described above (1.0 hr); followed by a wash of TiCl₄/chlorobenzene (0.5 hr) to give a Catalyst G containing 2.90% Ti, 0.87% ethyl benzoate and 12.0% di-isobutyl phthalate. The productivity of the catalyst, in a 2 hour LIPP run using 70:17.5:1 TEA:DPDMS:Ti, was 1896 kg PP/g Ti at 4.7% xylene solubles.

7B. (Gas phase) The procatalyst of Example 7A, Catalyst G, was used to carry our a propylene polymerization in gas phase for a period of 2 hours using 0.42/0.10/0.006 TEA:DPDMS:Ti (mol/mol/mol). The productivity of the catalyst was 1030 kg PP/g Ti at 3.5% xylene soluble.

8. (Comparative Example) Magnesium ethoxide (5.72 gm, 50 mmol) and Di-isobutyl phthalate (6.0 mmol/50 mmol Mg) were used in step a of the catalyst preparation described above (1.0 hr); followed by a wash of phthaloyl dichloride (2.0 mmol) in TiCl₄/chlorobenzene (1.0 hr); followed by a wash of TiCl₄/chlorobenzene (0.5 hr) to give a Catalyst H containing 2.72% Ti and 12.0% di-isobutyl phthalate. The productivity of the catalyst, in a 2 hour LIPP run using 70:17.5:1 TEA:DPDMS:Ti, was 1061 kg PP/g Ti at 4.0% xylene solubles.

9. Magnesium ethoxide (5.72 gm, 50 mmol) and Di-isobutyl phthalate (6.0 mmol/50 mmol Mg) were used in step a of the catalyst preparation described above (1.0 hr); followed by a wash containing both phthaloyl dichloride (2.0 mmol) and ethyl benzoate (1.8 mmol) in TiCl₄/chlorobenzene (1.0 hr); followed by a wash of TiCl₄/chlorobenzene (0.5 hr) to give a Catalyst I containing 2.70% Ti, 0.73% ethyl benzoate and 15.2% di-isobutyl phthalate. The productivity of the catalyst, in a 2 hour LIPP run using 70:17.5:1 TEA:DPDMS:Ti, was 1217 kg PP/g Ti at 3.2% xylene solubles.

For LIPP polymerizations using the above described ethyl benzoate (EB) catalysts, the autoclave with a 6.35 cm (2.5 inch) paddle stirrer and a two slat baffle was charged with 2.7 liters propylene and 132 mmol hydrogen then heated to 60° C. whereupon 0.35 mmol ethyl-p-ethoxy benzoate (PEEB) was injected followed closely by 0.70 mmol of triethylaluminum (TEA) followed by a 5% mineral oil slurry of procatalyst containing 0.01 mmol of Ti. After the initial exotherm the reactor temperature was held at 67° C. for 1.0 hr. For the phthalate ester-based catalysts the separate injection method may also be applied, i.e. to the propylene/hydrogen mixture at 65° C. is injected first 0.14 mmol of diphenyldimethoxysilane (DPDMS) followed by 0.56 mmol of TEA followed by procatalyst slurry containing from 0.003 to 0.007 mmol of Ti and polymerization carried out for a two hour period.

Gas phase polymerizations are carried out in the same autoclaves except that a helical stirrer has replaced the paddle stirrer and there is no baffle in the autoclave. The autoclave is initially charged with 2.1 MPa (300 psi) of propylene gas (and optionally 69 kPa (10 psi) hydrogen). The catalyst component are injected at reactor temperature of 60° c. as above using less than 35 cm³ of isopentane as carrier. The reactor temperature is raised to 67° C. and a 10 gram per minute flow of propylene is maintained over a two hour period so as to keep the reactor at 2.1 MPa (300 psi) while propylene is consumed.

The various catalyst prepared above are compared in Tables 1 and 2. Not all results are shown. Catalyst productivities and representative morphologies are shown.

TABLE 1

| Stoichiometric Compositions of Catalysts of Examples 1 to 9 | | | | | |
| --- | --- | --- | --- | --- | --- |
| Example | Catalyst | Ti (% w) | EB (% w) | OEt (% w) | Phthalate esters (% w) |
| 1 | A | 2.32 | 0 | 0.22 | 14 |
| 2 | B | 2.34 | 1.34 | 0.16 | 20 |
| 3 | C | 3.05 | 10.7 | 0.37 | 0 |
| 4 | D | 3.75 | 1.47 | 0.15 | 18 |
| 5 | E | 3.04 | 0 | 0.20 | 12.6 |
| 6 | F | 2.94 | 0.46 | 0.23 | 11.9 |
| 7 | G | 2.90 | 0.87 | 0.19 | 12.0 |
| 8 | H | 2.72 | 0 | 0.11 | 12.0 |
| 9 | I | 2.70 | 0.73 | 0.16 | 15.2 |

TABLE 2

| Composition and Productivities of Catalysts of Examples and Comparative Examples | | | | |
| --- | --- | --- | --- | --- |
| Example | Ti (% wt) | Preparative Method | Polymerization Time (hour) | Productivity (Kg PP/g Ti/ Kg PP/g Cat) | Xylene Solubles (% wt) |
| Ex. 1 Compar. | 2.32 | — | 2 | 966/22.4 | 5.3 |
| Ex. 2 | 2.34 | I | 2 | 1190/27.8 | 3.4 |
| Ex. 3 | | | | | |

TABLE 2-continued

Composition and Productivities of Catalysts of Examples and Comparative Examples

| Example | Ti (% wt) | Preparative Method | Polymerization Time (hour) | Productivity (Kg PP/g Ti/ Kg PP/g Cat) | Xylene Solubles (% wt) |
|---|---|---|---|---|---|
| Compar. Ex. 4 | 3.05 | — | 1 | 702/21.4 | 4.1 |
| Ex. 5A | 3.75 | III | 1 | 768/28.8 | 4.3 |
| Compar. Liquid Ex. 5B | 3.04 | — | 2 | 1391/42.3 | 4.8 |
| Compar. Gas Ex. 6 | 3.04 | — | 2 | 639/19.4 | 3.2 |
| Ex. 7A Liquid | 2.94 | II | 2 | 1496/44.0 | 4.9 |
| Ex. 7B Gas | 2.90 | I | 2 | 1896/55.0 | 4.7 |
| Ex. 8 Compar. | 2.90 | I | 2 | 1030/29.9 | 3.5 |
| Ex. 9 | 2.72 | — | 2 | 1061/28.8 | 4.0 |
|  | 2.70 | I | 2 | 1217/32.9 | 3.2 |

What is claimed is:

1. The process for preparing a solid catalyst component for use in the polymerization of olefins, which catalyst component contains magnesium, titanium and halogen and is prepared by the steps of:
    (a) halogenating a magnesium compound of formula Mg R'R", wherein R' is an alkoxy, alkyl carbonate or aryloxy group and R" is halogen or an alkyl, aryl, alkoxy, alkyl carbonate or aryloxy group with a first halide of tetravalent titanium and a first electron donor;
    (b$_1$) contacting the resulting halogenated product with a second halide of tetravalent titanium; and
    (c) washing a resulting treated halogenated product with an inert hydrocarbon liquid, characterized in that a second electron donor is used in step (a) or step (b$_1$) and in that the product of step (b$_1$) is contacted in a step (b$_2$) with a third halide of tetravlent titanium at a temperature of 40° to 140° C. and thereafter the treated product is washed in step (c).

2. The process according to claim 1 wherein step (a) comprises halogenating the magnesium compound with the first halide of tetravalent titanium and first electron donor until halogenation is essentially complete thereby forming an intermediate product which is not isolated, and contacting the intermediate product which is not isolated, with the second electron donor.

3. The process according to claim 1 wherein the first electron donor is isobutyl phthalate and the second electron donor is ethyl benzoate.

4. The process according to claim 1 wherein the halogenation in step (a) is conducted in the presence of halohydrocarbon.

5. The process according to claim 4 wherein the halohydrocarbon is chlorobenzene.

6. The process according to claim 1 wherein the amount of first electron donor is between 10 and 15 percent by weight, based on the weight of the halogenated product of step (a).

7. The process according to claim 6 wherein the amount of the second electron donor is between 2 and 50 percent by weight, based on the weight of the first electron donor.

8. The process according to claim 1 wherein different halides of tetravalent titanium are used in at least two of steps (a), (b$_1$) and (b$_2$).

9. The process according to claim 1 wherein titanium tetrachloride is used as at least one of the first, second, and third halide of tetravalent titanium.

10. A process according to any one of the preceding claims wherein the treated halogenated product from step (b$_2$) is treated again with a halide of tetravalent titanium before the washing step (c).

11. A process according to claim 10 wherein the halide of tetravalent titanium used in the additional treatment step is the same as at least one of the first and second halide of tetravalent titanium.

* * * * *